(No Model.)
T. G. MANDT.
WAGON BRAKE LEVER.
No. 536,638. Patented Apr. 2, 1895.
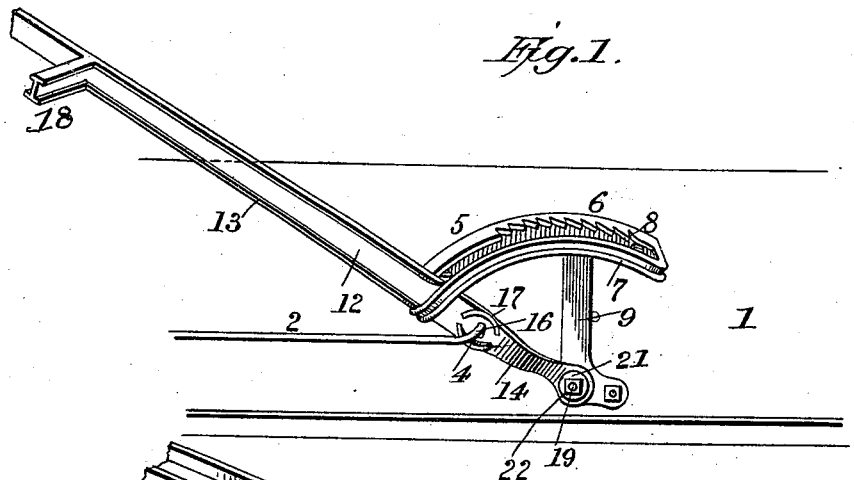
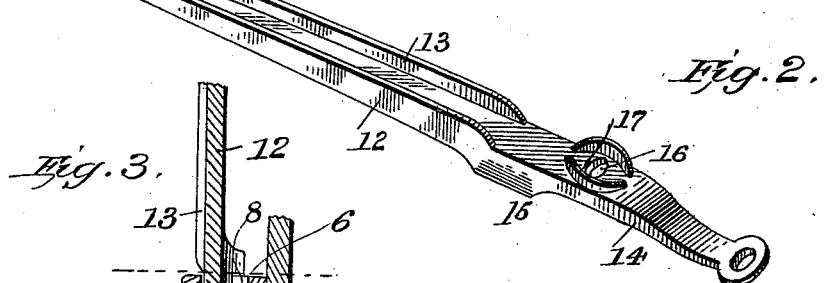
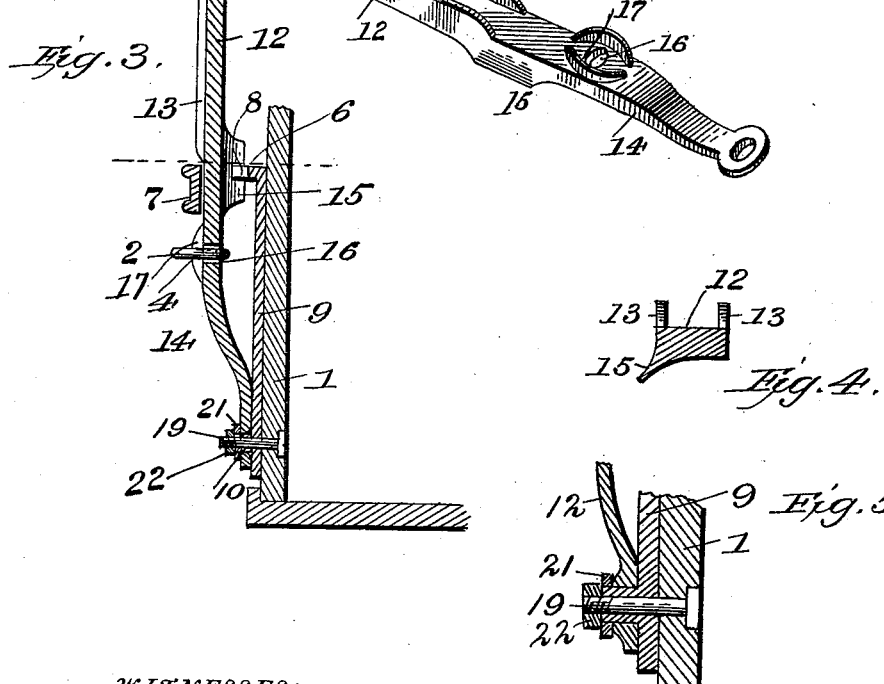
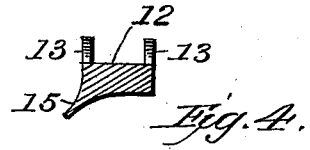
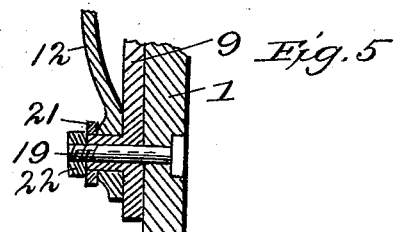
WITNESSES:
F. L. Ourand
Ho. L. Coombs
INVENTOR:
Targe G. Mandt,
by Louis Jagger & Co.
Attorneys.

UNITED STATES PATENT OFFICE.

TARGE G. MANDT, OF STOUGHTON, ASSIGNOR TO JOHN A. JOHNSON, OF MADISON, WISCONSIN.

WAGON-BRAKE LEVER.

SPECIFICATION forming part of Letters Patent No. 536,638, dated April 2, 1895.

Application filed June 18, 1894. Serial No. 514,905. (No model.)

*To all whom it may concern:*

Be it known that I, TARGE G. MANDT, a citizen of the United States, and a resident of Stoughton, in the county of Dane and State of Wisconsin, have invented certain new and useful Improvements in Wagon-Brake Levers; and I do hereby declare that the following is a full, clear, and exact description of the invention, which will enable others skilled in the art to which it appertains to make and use the same, reference being had to the accompanying drawings, which form a part of this specification.

My invention relates to levers for wagon brakes, and its object is to provide an improved construction of the same whereby when the lever is actuated to set the brakes, it will be automatically locked in position through the tension of the brake-rod, thus enabling me to dispense with the usual pawls and dogs usually employed for such purpose.

The invention consists in the novel construction and combination of parts hereinafter fully described and claimed.

In the accompanying drawings, Figure 1 is a perspective view of a wagon brake lever and connections constructed in accordance with my invention. Fig. 2 is a perspective view of the lower part of the lever. Fig. 3 is a central longitudinal sectional view. Fig. 4 is a cross sectional view of the lever. Fig. 5 is a detail section of the lower end of the brake rod.

In the said drawings the reference numeral 1 designates a portion of the body or box of a wagon provided with brake mechanisms, (not shown) but which may be of any ordinary or suitable construction.

The numeral 2 designates the brake rod constructed with the usual brake beam (not shown), and having its other end bent into a hook 4, adapted to engage with a hole or aperture in the brake lever hereinafter described.

The numeral 5 designates a cast metal bracket comprising the segmental arms 6 and 7, one of which is formed with a series of rack-teeth 8. These arms are connected together at each end forming a space in which the brake lever plays and is guided. The bracket is secured to the wagon-body or box by bolts or otherwise and is formed with a downwardly depending arm 9, having a stud or journal 10, near its lower end, formed with a hole or aperture. Journaled or fulcrumed on this stud is the brake lever 12, formed of malleable metal and provided with strengthening ribs 13. The hole or aperture at the lower end of the lever through which the stud 10 passes, is somewhat larger than the latter, so that the brake lever may have a wabbling or twisting movement thereon.

Above the lower end the lever is formed with a bend 14, and above this bend it is formed with a flange 15, which is adapted to engage with the rack-teeth 8, and lock the lever as hereinafter described. Intermediate of said bend and flange the lever is formed with a hole or aperture 16, with which the hooked end of the brake-rod engages and with an offset or shoulder 17 at one side of said hole against which the said brake-rod bears. The upper end of the lever is bent outwardly at an angle forming a handle 18. The lever is held in place on the stud by means of bolt 19, washer 21, and nut 22.

The operation is as follows: To set the brake the handle of the lever is grasped and pulled or pushed in a directiona way from the brake-beam, which will actuate the brake-rod and cause the shoes to be pressed against the wheel. When the requisite pressure has been applied, the tension of the brake-rod, bearing on the shoulder 17, will twist the lever on its fulcrum or pivot, and cause the flange 15 to engage with the rack teeth 8 of the bracket, and thus lock the brake lever in position. By means of the bend 14, in the lever, and the brake rod being connected therewith from the outside, the lever when pushed ahead is automatically thrown into the ratchet, and released by a simple twist of the handle. To release the lever, the lever by means of the handle, is twisted in a reverse direction, causing the flange to be disengaged from the rack teeth.

From the above it will be seen that I dispense with the use of pawls, dogs, springs, and other similar devices, the whole locking mechanism consisting of but two parts, viz., the lever and bracket.

Having thus described my invention, what I claim is—

1. In a brake lever locking mechanism the combination with the guide bracket having arms, one of which is formed with rack teeth, and the stud journaled near the lower end of the bracket, of the brake lever loosely fulcrumed on said stud and formed with an aperture to receive the end of a brake-rod, an offset or shoulder and a flange adapted to engage with said rack teeth, substantially as described.

2. In a brake lever locking mechanism, the combination with the guide bracket having arms, one of which is formed with rack teeth, and the stud near the lower end of the bracket, of the brake lever loosely fulcrumed on said stud and formed above its lower end with a bend and an aperture, and with a flange adapted to engage with said rack teeth, and the brake rod connected with said aperture from the outside, substantially as described.

In testimony that I claim the foregoing as my own I have hereunto affixed my signature in presence of two witnesses.

TARGE G. MANDT.

Witnesses:
BEN. E. WAIT,
A. O. ERICKSON.